K. KAFAFIAN & G. ESMARIAN.
VEHICLE WHEEL.
APPLICATION FILED MAR. 5, 1918.
1,268,252.
Patented June 4, 1918.
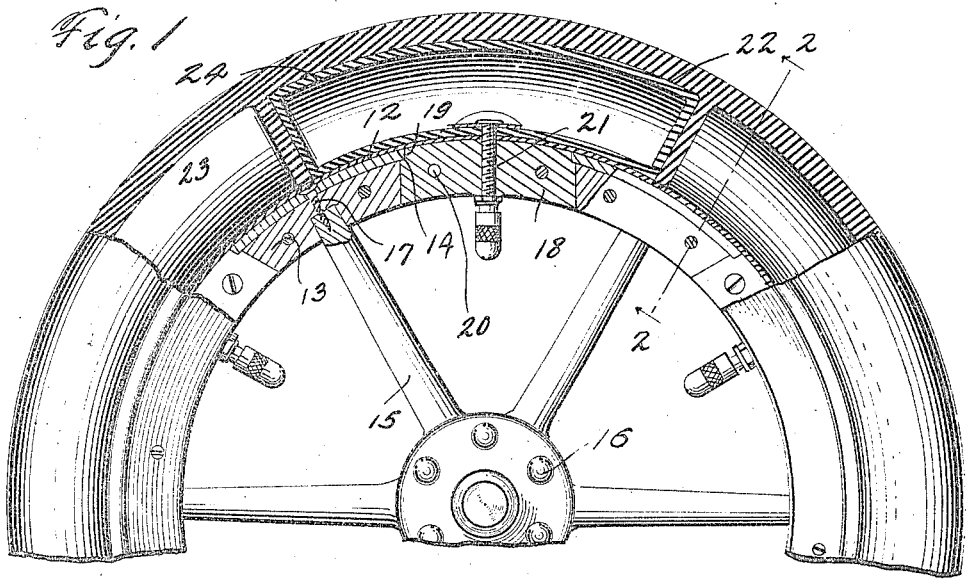
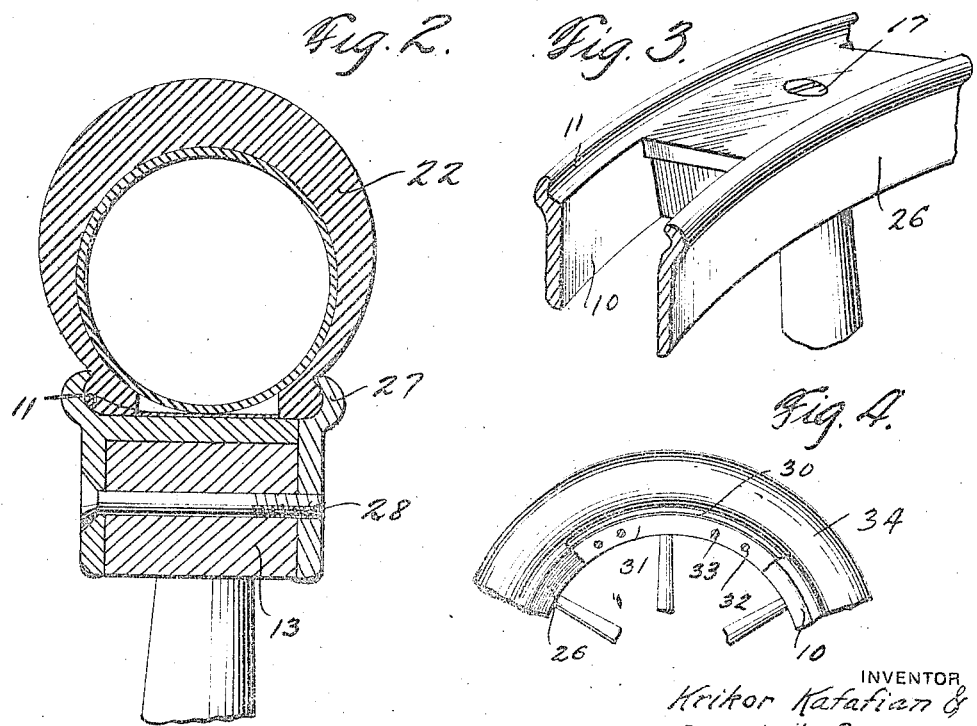
INVENTOR
Krikor Kafafian &
Garabed Esmarian
WITNESSES
BY
ATTORNEY

UNITED STATES PATENT OFFICE.

KRIKOR KAFAFIAN AND GARABED ESMARIAN, OF PATERSON, NEW JERSEY.

VEHICLE-WHEEL.

1,268,252.

Specification of Letters Patent.  Patented June 4, 1918.

Application filed March 5, 1918. Serial No. 220,574.

*To all whom it may concern:*

Be it known that we, KRIKOR KAFAFIAN and GARABED ESMARIAN, a citizen of the United States and applicant for citizenship, having filed first papers, respectively, residing at Paterson, in the county of Passaic and State of New Jersey, have invented certain new and useful Improvements in Vehicle-Wheels, of which the following is a specification.

This invention has relation to pneumatic tires and vehicle wheels, and has for one of its objects the provision of the pneumatic tire including a casing and a plurality of tubular sections inclosed therein in circumferential order, adapted to be inflated individually so as to constitute in effect, separate and independent inner tubes whereby in the event that one section is punctured it may be readily replaced at small cost, and for other reasons which will presently appear.

Another object of the invention is to provide an improved vehicle wheel constructed in a manner to support a pneumatic tire of the character above set forth whereby any one of the tubular sections may be removed and replaced without disturbing the other parts of the wheel.

A still further object of the invention is to provide an improved pneumatic tire and vehicle wheel, embodying the features above set forth which are more specifically a rim section formed of circumferentially arranged blocks, alternate blocks being removable, and alternate blocks relatively fixed to which the spokes are connected, and a pneumatic tire including a sectional inner tube having the sections thereof located adjacent the removable blocks whereby, in the event that a tubular section is punctured the adjacent blocks may be removed to provide an aperture through which the injured tubular section may be abstracted and subsequently replaced.

In addition to the foregoing our invention comprehends improvements in the details of construction and arrangement of the correlative parts to be hereinafter more fully described and particularly set forth in the appended claims.

In the accompanying drawings in which similar and corresponding parts are designated by the same characters of reference throughout the several views in which they appear;—

Figure 1, is a fragmentary view, partly in elevation and partly in section of a vehicle wheel and tire constructed in accordance with our invention.

Fig. 2, is a transverse section taken on the line 2—2 of Fig. 1.

Fig. 3, is a fragmentary sectional perspective of a portion of the rim and flanges of the wheel, and Fig. 4, is a fragmentary view of a modified form of our invention.

The wheel comprises a rim section formed of an annular flange 10 provided with an outer peripheral clencher rim 11. Formed upon the inner face of the flange 10 is a plurality of laterally extending lugs 12 considerably less in thickness than the width of the flange. The lugs are disposed in uniform spaced relation as indicated. Applied to the inner face of each lug is a segmental block 13 having its ends beveled so that the adjacent faces of adjacent blocks will be parallel. The blocks 13 are slightly less in length than the length of the lugs whereby to define shoulders 14 at the ends of the lugs. Each block 13 is perforated upon its inner face to receive the spokes 15 which are extended radially and connected to the hub section 16 of the wheel. The spokes may be anchored by means of screws 17 inserted in openings in the lugs 12 and into the spokes. Said screws also serve to secure the blocks to the lugs. The spacing of the blocks 13 defines spaces in which removable blocks 18 are placed, said blocks being arcuate in configuration to conform to the curvature of the rim, and are furthermore notched at each end as at 19 whereby the shoulders 14 at the ends of the lugs may seat in said notches when the blocks 13 are in place. It will be noted that the blocks 18 are inserted into the space from the inside of the rim and are pushed outwardly until their movement is limited by engagement with the shoulders 14. The outer surfaces of the blocks will then lie flush with the outer faces of the lugs 12, and form in conjunction therewith a smooth peripheral surface against which the shoe is seated. The blocks 18 are held in place by means of bolts 20 which enter openings in the blocks and in the flange 10. Each block is formed with a radial opening in which the inflating valve 21 is inserted. The pneumatic tire comprises a casing 22 similar in outward appearance to the conventional type of casing, but is divided interiorly by means of a plurality of radial, transversely extending partitions 23 which are located in planes substantially coincident with the plane of the spokes. The partitions define compartments 24 in which are located the tubular inflatable sections 25 constructed in a manner similar to that of an inner tube and having the valves 21 whereby they may be individually inflated. When the parts above mentioned are assembled in the manner stated they are held in place by means of an annular clamping flange 26 similar to the flange 10 and in a like manner formed with a peripheral clencher rim 27 to coact with the rim 11 in securing the beading of the shoe therebetween. The flange 26 is perforated to receive bolts 28 which extend also through openings in the blocks 13 and in the flange 10. The bolts 28 are provided at one end with conical heads to be seated in countersunk openings in the flange 10, while the opposite ends are threaded to engage in the openings of the flange 26 which openings are correspondingly threaded to receive the same. The ends of the bolts which project through the flange 26 are formed with a transverse kerf whereby they may be readily engaged and readily removed by means of a screw driver or other tool from the outside of the wheel.

In the event that any one of the inner tube sections 25 is punctured the same may be removed by first removing the clamping flange 26, then withdrawing the bolts 20 which secure the blocks 18 which is located beneath the particular inner tube section injured. Said block together with the injured tubular section may be easily withdrawn and either the tubular section repaired or a new section substituted. The block and tubular section may then be replaced and the clamping flange 26 reapplied. It will be seen that none of the other parts need be removed or displaced and hence a repair can be quickly made with this arrangement. The cost of a repair is likewise reduced since only the particular section of inner tube injured need be replaced. A strip of rubber or similar material of a length corresponding to the length of each tubular section 25 may be interposed between the under side of said tubular section and the outer surface of the rim so as to prevent injury to said tubular section, and the inner edges of the beading of the casing may be cut away as indicated in Fig. 2 to permit a tool to be inserted therebetween to remove or insert the tubular section.

We have illustrated in Fig. 4 of the drawings a modified form of our invention in which the flanges 10 and 26 are utilized; in this case however, in lieu of the lugs 12 a circumferential rim 30 is formed on the flange 10 corresponding in thickness to the thickness of the lugs. In place of the spaced blocks 13, a continuous annular felly 31 is applied to the flange 10 and inclosed within the rim 30, bolts 32 being inserted in said felly and flange, to hold the parts together. The clamping flange 26 is then applied to the face of the felly and secured by means of bolts 33 which pass through said flange, the felly and the flange 10. A conventional form of casing 34 and inner tube may be associated with this form of wheel. The spokes 35 are secured in the felly in the usual manner.

While we have illustrated and described our invention with some degree of particularity, we realize that in practice various alterations thereover may be made, and we therefore desire to reserve the right and privilege of changing the form of the details of construction and arrangement of the correlative parts without departing from the spirit of the invention or the scope of the appended claims.

Having thus described our invention what we claim as new and desire to secure by Letters Patent is:—

1. In combination, a vehicle wheel including an annular flange, lateral circumferentially spaced lugs on said flange, blocks applied to said flange and the under side of the lugs, a hub section, and spokes radiating from said hub section and secured at their ends to the blocks.

2. In a vehicle wheel, an annular flange, lateral circumferentially spaced lugs on said flange, blocks applied to one side of the flange and beneath the lugs, a hub section, spokes radiating from said hub section and connected at their outer ends to the blocks, and a clamping flange for attachment to the blocks whereby a tire casing may be secured between said flanges.

3. In a vehicle wheel, an annular flange, lateral circumferentially spaced lugs on one side face of the flange, a block secured to the inner face of each lug, a hub section, spokes radiating from said section, and secured at their outer ends to the blocks, removable blocks located between said first mentioned block, an annular clamping flange applied to said blocks, and means for securing the clamping flange to the first mentioned flange.

4. In a vehicle wheel, a flange, a plurality of arcuate lugs, extending laterally from one side face of the flange in circumferentially spaced relation, said lugs being less in thickness than the width of the flange, an arcuate block applied to the inner face of each lug, said block being spaced slightly inward at their ends from the ends of the lugs to define shoulders, removable blocks inserted between the first mentioned blocks, each removable block being notched at each end to receive the shoulders, means for securing both sets of blocks to the flange, a clamping flange applied to the blocks, means for securing both flanges together, a hub section, and spokes radiating from said hub section and connected to the first mentioned block.

In testimony whereof we affix our signatures in presence of a witness.

KRIKOR KAFAFIAN.
GARABED ESMARIAN.

Witness:
M. E. JONES.